(12) United States Patent
Ortt et al.

(10) Patent No.: US 6,909,218 B2
(45) Date of Patent: Jun. 21, 2005

(54) END CAP AND BRUSH BOX ASSEMBLY

(75) Inventors: Earl M. Ortt, Bel Air, MD (US);
Michael J. Agnes, Bel Air, MD (US);
Michael Zemlok, Towson, MD (US)

(73) Assignee: Black & Decker Inc., Newark, DE (US)

( * ) Notice: Subject to any disclaimer, the term of this patent is extended or adjusted under 35 U.S.C. 154(b) by 156 days.

(21) Appl. No.: 10/374,341

(22) Filed: Feb. 26, 2003

(65) Prior Publication Data

US 2004/0164643 A1 Aug. 26, 2004

(51) Int. Cl.$^7$ .......................... H02K 5/14; H01R 39/38
(52) U.S. Cl. ...................... 310/239; 310/89; 310/242; 310/245
(58) Field of Search ........................ 310/89, 238, 239, 310/242, 245

(56) References Cited

U.S. PATENT DOCUMENTS

| | | | | |
|---|---|---|---|---|
| 2,984,758 A | * | 5/1961 | Hansen et al. | 310/239 |
| 3,127,533 A | | 3/1964 | Gardner, Jr. | 310/245 |
| 3,212,041 A | * | 10/1965 | Dixon | 336/149 |
| 3,525,891 A | * | 8/1970 | Lukawich et al. | 310/239 |
| 3,617,786 A | * | 11/1971 | Stielper | 310/242 |
| 4,056,749 A | * | 11/1977 | Carison et al. | 310/239 |
| 4,293,789 A | * | 10/1981 | King | 310/239 |
| 4,355,253 A | | 10/1982 | Vollbrecht | 310/239 |
| 4,498,230 A | * | 2/1985 | Harris et al. | 29/597 |
| 4,593,221 A | | 6/1986 | Harris et al. | 310/242 |
| 4,673,837 A | | 6/1987 | Gingerich et al. | 310/239 |
| 4,782,261 A | * | 11/1988 | Crevling et al. | 310/242 |
| 4,851,730 A | | 7/1989 | Fushiya et al. | 310/249 |
| 4,963,779 A | * | 10/1990 | Lentino et al. | 310/71 |
| 4,990,811 A | | 2/1991 | Nakata et al. | 310/239 |
| 5,397,952 A | * | 3/1995 | Decker et al. | 310/242 |
| 5,696,418 A | | 12/1997 | Corbach et al. | 310/239 |
| 5,990,594 A | | 11/1999 | Hyatt, Jr. et al. | 310/249 |
| 6,020,668 A | | 2/2000 | Rubinchik | 310/239 |
| 6,144,134 A | | 11/2000 | Lin | 310/239 |
| 6,229,242 B1 | | 5/2001 | Autret et al. | 310/239 |
| 6,288,469 B1 | | 9/2001 | Kimura et al. | 310/239 |
| 6,294,857 B1 | | 9/2001 | Nakane | 310/239 |
| 6,608,423 B2 | * | 8/2003 | Tam | 310/239 |
| 6,798,109 B2 | * | 9/2004 | Ortt et al. | 310/242 |

FOREIGN PATENT DOCUMENTS

| | | | |
|---|---|---|---|
| DE | 1 178 506 | 9/1964 | |
| DE | 74 36 548 | 5/1976 | |
| DE | 76 09 317 | 7/1976 | |
| DE | 79 33 642 | 4/1980 | .......... H01R/39/38 |
| DE | 84 27 583.9 | 5/1985 | ............ H02K/5/14 |
| DE | 42 42 720 | 6/1994 | |
| DE | 1 293 322 | 4/1996 | |
| DE | 198 53 641 | 9/1999 | |
| EP | 0 175 992 | 4/1986 | ............ H02K/5/14 |
| EP | 0 215 334 | 3/1987 | ............ H02K/5/15 |
| EP | 1 184 959 | 3/2002 | ............ H02K/5/14 |

* cited by examiner

Primary Examiner—Burton Mullins
(74) Attorney, Agent, or Firm—Harness, Dickey & Pierce, P.L.C.

(57) ABSTRACT

A end cap and brush box assembly for a mechanically commutated electric motor including an end cap constructed from high temperature material which also has resilient mechanical properties. The end cap and brush box assembly includes a two piece brush box having a first lock tab and a second lock tab for securing the two piece brush box to the end cap. The two piece brush box has a brush hood secured to a base plate. The base plate has a shunt welding plate for welding to an electrical shunt of a brush and a connector for connecting to an electrical lead coupled to a power source.

45 Claims, 5 Drawing Sheets

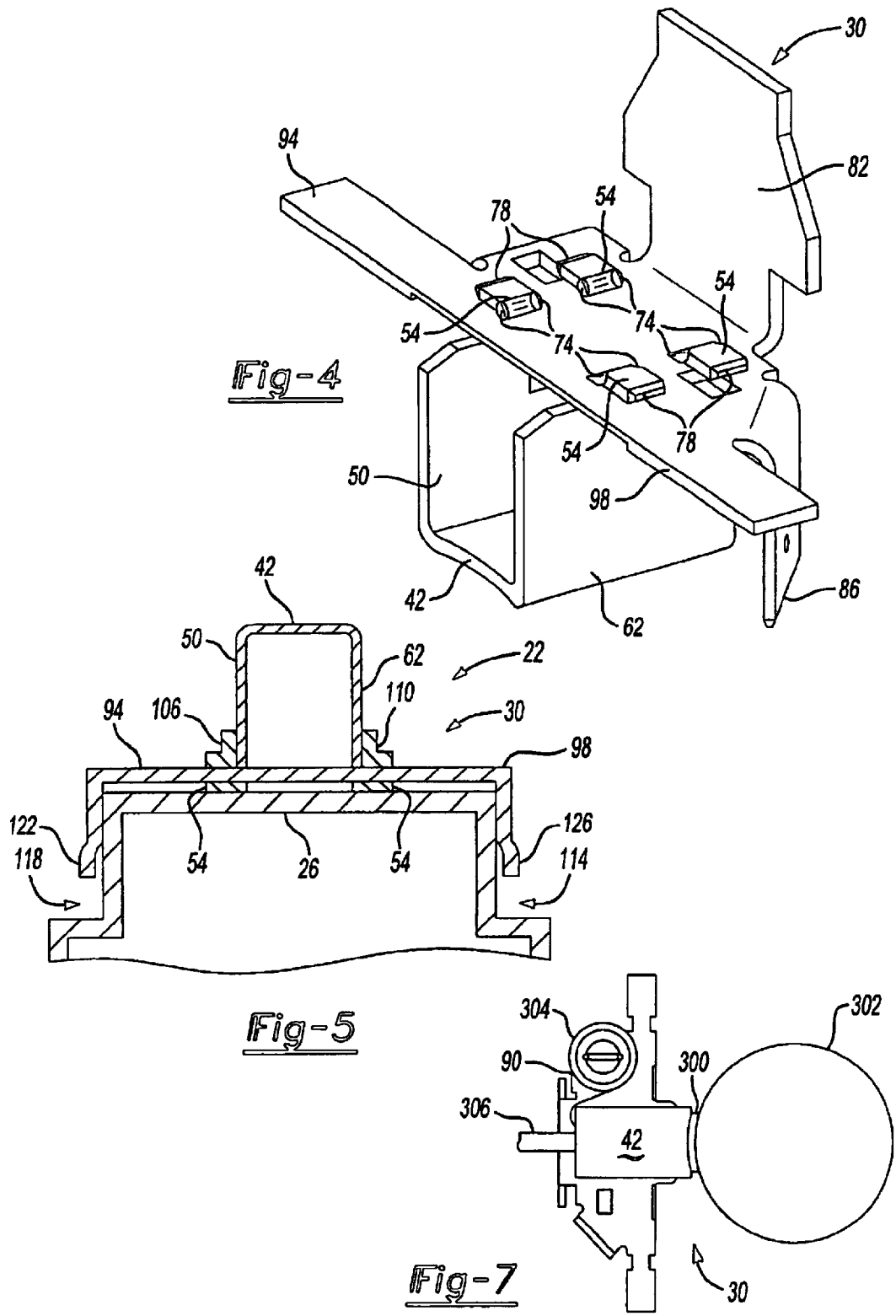

END CAP AND BRUSH BOX ASSEMBLY

FIELD OF INVENTION

The invention relates generally to electric motors, and more particularly to an end cap and brush box assembly having a two-piece brush box for a mechanically commutated electric motor.

BACKGROUND OF THE INVENTION

Mechanically commutated motors utilize a commutator and brushes to transfer electric power to a rotating element of the motor, typically an armature. The armature has a shaft on which a commutator is affixed. Generally, the brushes transfer power from a DC or AC power source to the commutator causing the armature to rotate. Each brush is supported adjacent the commutator so that it contacts the commutator. In some cases, each brush is at least partially enclosed in a brush box that is used to connect the brush to the power source and to support the brush adjacent the commutator. One type of brush box is a one piece device constructed of electrically conductive material, such as copper or brass. The brush box may be mounted by being attached to an end cap affixed to one end of the motor housing. The end cap also typically provides a bearing support that supports a bearing in which the armature shaft is journaled. In this regard, the one piece brush box is often secured to the end cap at only one point.

The one piece design of brush boxes often does not securely retain the brush during motor operation, thereby allowing the brush to move, which can cause excessive wear on the brush and the commutator. Additionally, securing the brush box at only one point also allows the brush to move causing excessive wear. Also, brush boxes with only one connection point may more easily separate from the element of the motor on which they are mounted causing the motor to fail. The excessive wear, or possible failure, create added costs in parts, labor, and maintenance.

Further yet, end caps are not generally constructed of materials having high temperature properties and thus are not well suited to withstand excessive heat generated by the interaction between the commutator and the brushes during prolonged operation of the motor. Therefore, prolonged or repeated use at high current loadings over the long periods of time could cause an end cap on which a brush box is mounted to char, deform, or melt, thereby causing the motor to fail and add further parts, labor, and maintenance costs.

BRIEF SUMMARY OF THE INVENTION

In an aspect of the invention, an end cap and brush box assembly for a mechanically commutated electric motor is provided. The end cap and brush box assembly includes an end cap for the motor constructed of a high temperature material having resilient mechanical properties. The end cap and brush box assembly also includes a two piece brush box with the two pieces secured together by a plurality of coupling tabs. One of the pieces has a plurality of locking tabs that secure the brush box to the end cap.

In another aspect of the invention, a method is provided for assembling an end cap and brush box assembly for a mechanically commutated electric motor The method includes inserting a plurality of coupling tabs extending from a brush box hood into a plurality of corresponding openings in a brush box base plate. Then the coupling tabs are bent such that the brush box hood is coupled to the brush box base plate, resulting in a two-piece brush box. The method further includes stamping at least one indentation into each coupling tab causing each coupling tab to laterally expand, thereby tightly securing the brush box hood to the brush box base plate. The two piece brush box is then directly mounted on an end cap at a plurality of mounting points.

In another aspect of the invention, a brush box is provided. The brush box includes a brush hood having a first leg with at least one coupling tab extending therefrom and a second leg with at least one coupling tab extending therefrom. The brush box also includes a base plate having a plurality of coupling tab openings, a first lock tab and a second lock tab. The first and second lock tabs are used for directly attaching the brush box to an end cap of the motor. Each of the coupling tabs extend through a corresponding one of the coupling tab openings, is bent at approximately a 90° angle, and includes at least one stamped indentation that laterally displaces at least a portion of that coupling tab. The displacement tightly secures the brush hood to the base plate.

BRIEF DESCRIPTION OF THE DRAWINGS

The present invention will become more fully understood from the detailed description and accompanying drawings, wherein;

FIG. 4 illustrates an alternative embodiment of the brush box shown in FIG. 3B;

FIG. 5 is a cross-sectional view of a portion of the end cap and brush box assembly shown in FIG. 2B showing an alternative embodiment of the invention;

FIG. 7 is a top perspective view of the brush box shown in FIGS. 2A and 2B with a spring and brush mounted therein.

DETAILED DESCRIPTION OF THE INVENTION

Figure 1:
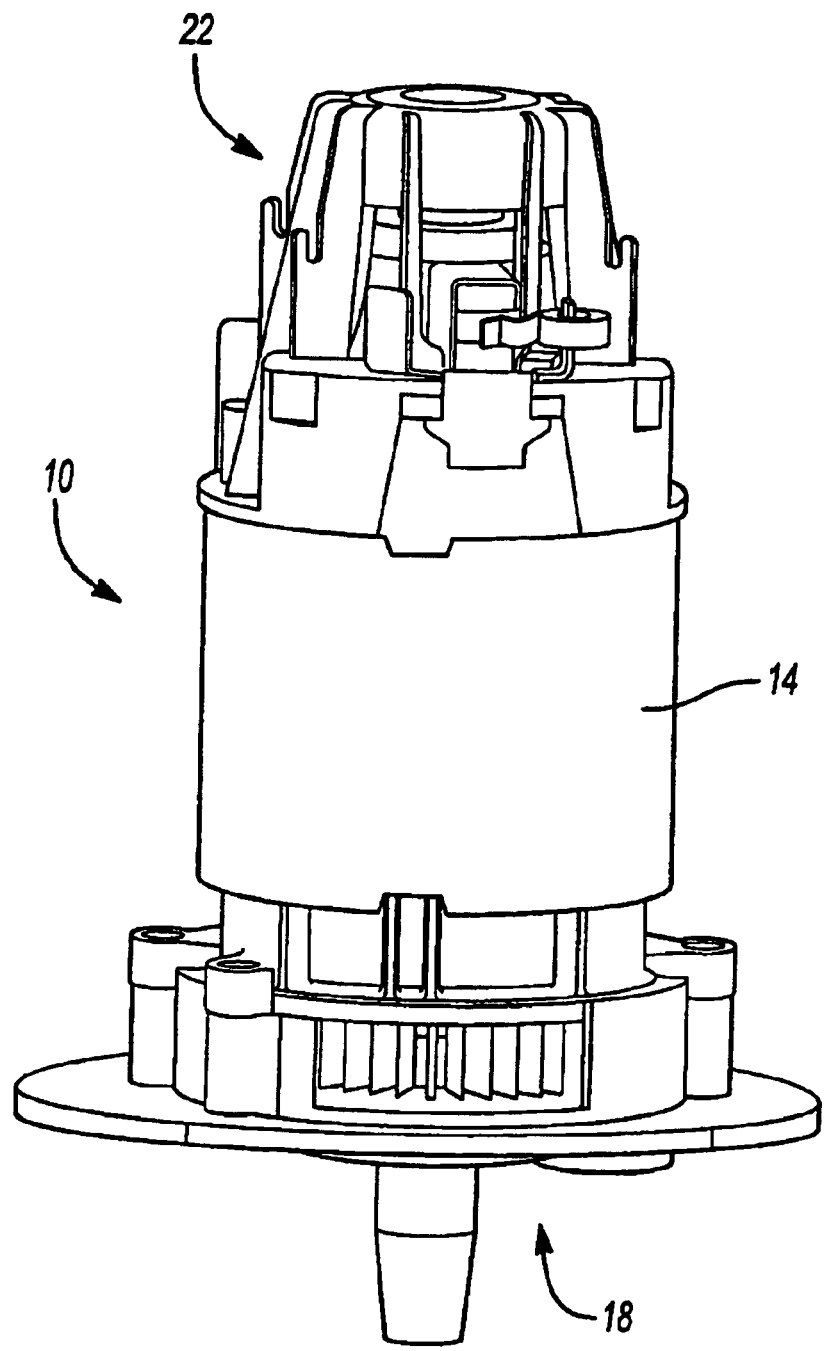
FIG. 1 is a perspective view of an electric motor in accordance with an embodiment of the invention.

FIG. 1 is a perspective view of a mechanically commutated electric motor 10, in accordance with one preferred embodiment of the present invention. Generally, the motor 10 includes a housing 14, sometimes referred to as a magnet ring or stator, a first bearing support 18 coupled to one end of the housing 14, and an end cap and brush box assembly 22 coupled to an opposed end of the housing 14. The end cap and brush box assembly 22 includes an end cap 26 that typically provides a second bearing support. The motor 10 can be utilized in any electromechanical device that utilizes torque provided by the motor 10 to perform an intended mechanical function. For example, the motor 10 can be used in a power tool, a household appliance, or any other device that implements a motor to provide mechanical power used by the device. Additionally, the motor 10 can be either an AC or DC powered motor. Motor 10 can also be various types such as a permanent magnet motor or a universal motor.

Figure 2A:
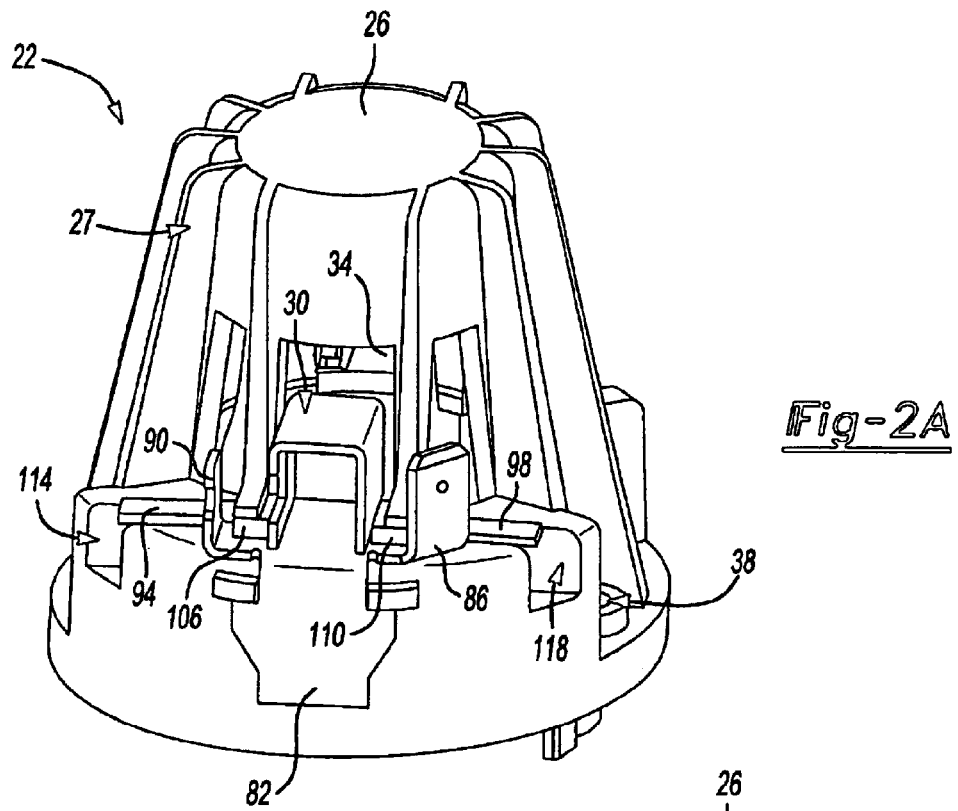
FIG. 2A illustrates a first perspective view of an end cap and brush box assembly shown in FIG. 1.
Figure 2B:
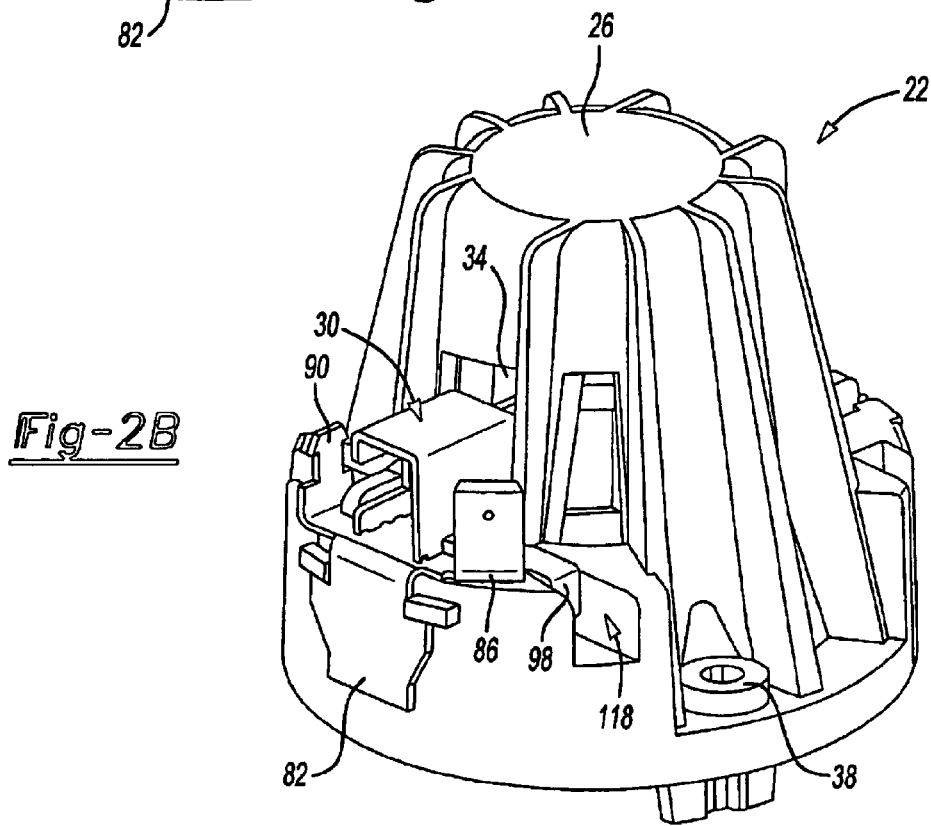
FIG. 2b illustrates a second perspective view of the end cap and brush box assembly shown in FIG. 1.

FIGS. 2A and 2B illustrate two different perspective views of the end cap and brush box assembly 22 shown in FIG. 1. The end cap and brush box assembly 22 includes an end cap 26 and a two piece brush box 30, herein simply referred to as brush box 30, directly mounted on or attached to end cap 26. End cap 26 provides a bearing support 27 in which a shaft of the armature (not shown) of motor 10 is journaled. Brush box 30 is adapted to retain a brush 300 (FIG. 7) that extends through an opening 34 in end cap 26 and contacts a commutator 302 (FIG. 7) at least partially enclosed by end cap 26. The end cap and brush box assembly 22 is connected to the motor housing 14 (shown in FIG. 1) by coupling end cap 26 to the motor housing 14 using any suitable means. For example, end cap 26 could be bolted or screwed to the motor housing 14 using at least one mounting hole 38, or riveted or crimped to motor housing 14.

In an embodiment, end cap 26 is constructed of a high temperature material, that is, a material having good high temperature properties, such that end cap 26 can withstand high temperatures without melting, deforming, breaking, or becoming brittle. Therefore, heat generated during heavy use of the motor will not damage end cap 26. Additionally, end cap 26 is constructed of a material having good resilient mechanical properties, such that end cap 26 will withstand a reasonable impact without sustaining damage. For example, end cap 26 could be constructed of a polyphthala-mide (PPA) based material or a polyphenolyne sulphide (PPS) based material, both of which would possess high temperature properties and good resilient mechanical properties.

Figure 3A:
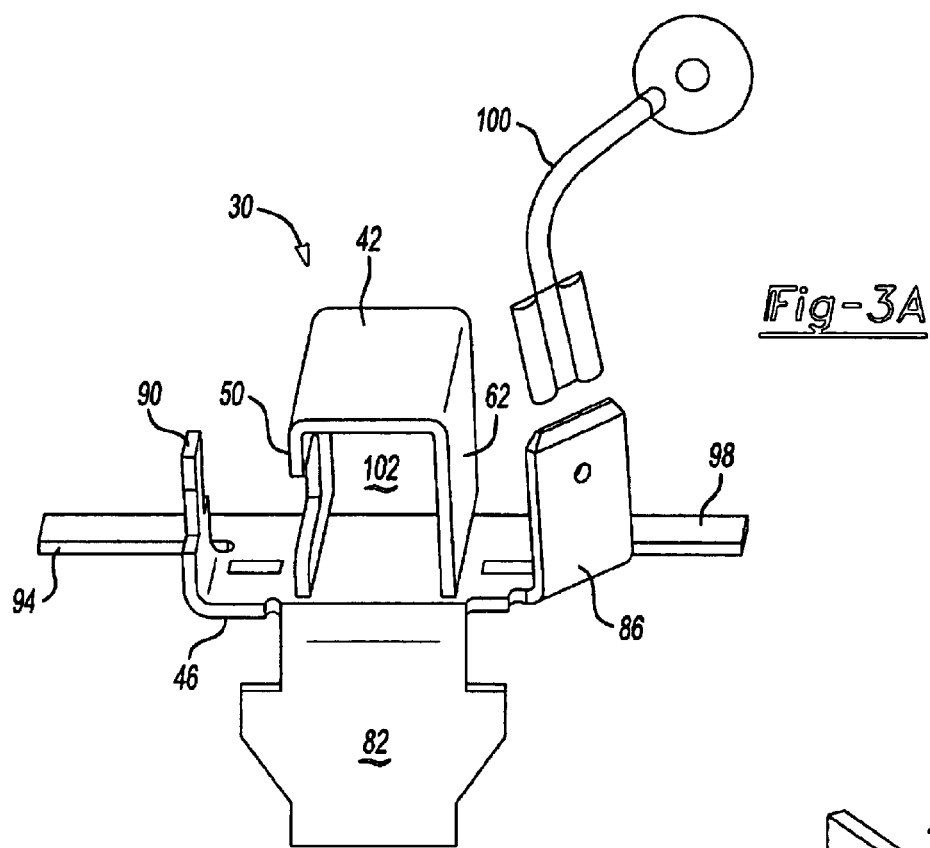
FIG. 3A is a top perspective view of a brush box shown in FIGS. 2A and 2B.
Figure 3B:
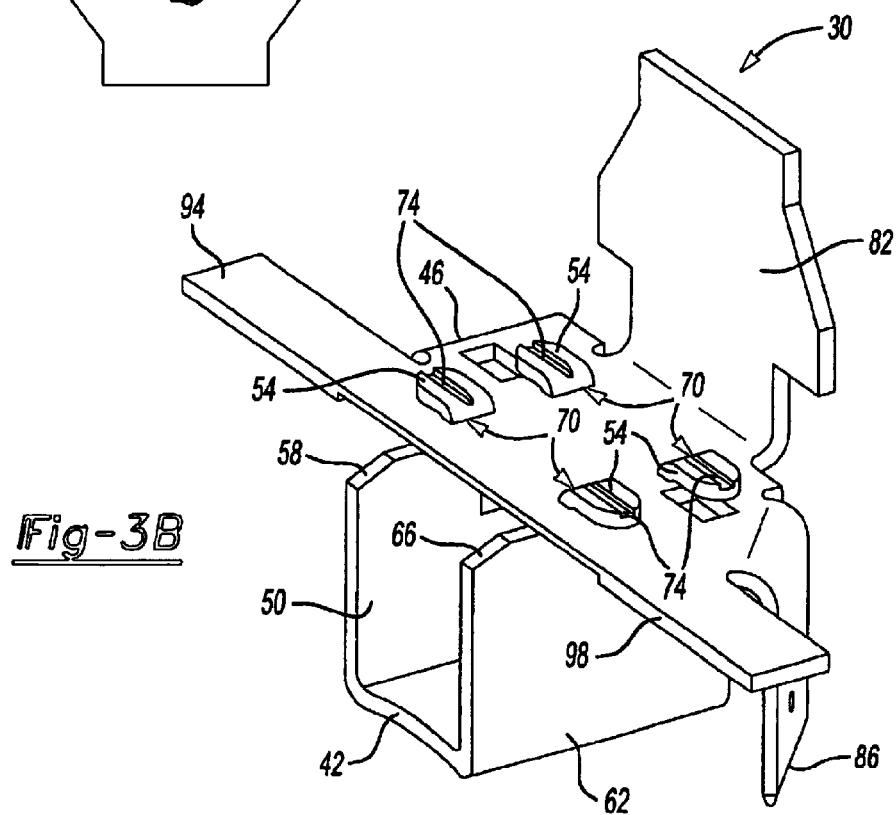
FIG. 3B is a bottom perspective view of the brush box shown in FIGS. 2A and 2B.

FIGS. 3A and 3B respectively illustrate a top perspective view and bottom perspective view of the brush box 30, shown in FIGS. 2A and 2B, in accordance with an embodiment of the present invention. The brush box 30 includes a brush hood 42 coupled to a base plate 46. The brush hood 42 is generally U-shaped including a first leg 50 having at least one coupling tab 54 extending from a distal end 58 of first leg 50, and a second leg 62 having at least one coupling tab 54 extending from a distal end 66 of second leg 62. The brush hood 42 is coupled to the base plate 46 by extending the coupling tabs 54 through a plurality of corresponding coupling tab openings 70 in the base plate 46 and then bending the coupling tabs 54 approximately 90° so that the coupling tabs 54 secure the first and second legs 50 and 62 to the base plate 46.

To essentially remove any gap that may exist between the coupling tabs 54 and the base plate 46, thereby firmly securing the base plate 46 to the brush hood 42, each of the coupling tabs 54 is coined by being stamped with at least one indentation 74. Coining each coupling tab 54 causes at least a portion of each coupling tab 54 to laterally displace, thereby tightly securing the brush hood 42 to the base plate 46 such that vibrations incurred during operation of the motor 10 will not cause the brush hood 42 to loosen from the base plate 46. Additionally, coining each coupling tab 54 reinforces the bend in each coupling tab 54 so that vibrations that occur during operation of the motor 10 will not cause the bend in each coupling tab 54 to change shape such that the brush hood 42 loosens from the base plate 46.

In the embodiment shown in FIG. 3B, the stamped indentation 74 is a groove or gusset stamped into each coupling tab 54. The groove or gusset extends the length of each coupling tab 54 and laterally displace the material comprising each coupling tab 54 such that the displaced material removes any gaps, or 'play', that may exist between the coupling tabs 54 and the base plate 46. Coupling tabs 54 may illustratively be made of a reasonable pliable, or malleable, material such as copper or brass, so that when each coupling tab 54 is stamped the material is readily displaced.

FIG. 4 illustrates an alternative embodiment of the brush box 30. In this alternative embodiment, each coupling tab 54 is coined at a plurality of locations by being stamped with a plurality of indentations 74. In this embodiment, each indentation 74 is a recess stamped along a side edge of each coupling tab 54, illustratively where coupling tab 54 is bent. Each recess displaces the material of the associated coupling tab 54, thereby removing any gaps, or 'play', that may allow the hood 42 to undesirably vibrate, move, or chatter during operation of the motor 10. A distal end 78 of each coupling tab 54 may illustratively be tapered, or chamfered, to ease the insertion of each coupling tab 54 through the corresponding coupling tab opening 70 in the base plate 46. The distal end 78 of each coupling tab 54 can illustratively have a tapered width, a tampered thickness, and/or a tapered width and thickness.

Referring again to FIGS. 3A and 3B, the base plate 46 includes a shunt welding tab 82, a terminal connector post 86, a spring post 90, a first lock tab 94 and a second lock tab 98. When the brush box 30 is directly mounted on end cap 26 and the rest of motor 10 is assembled such that commutator 302 (FIG. 7) is at least partially enclosed by end cap 26, a brush 300 (FIG. 7) is positioned in an area 102 enclosed by the brush hood 42 and the base plate 46. Additionally, a spring 304 (FIG. 7), or other retaining means, is associated with the spring post 90 and used to retain the brush 300 within the area 102 and in contact with the commutator 302. Furthermore, an electrical shunt 306 (FIG. 7) connected to the brush 300, is secured to the shunt welding tab 82 by any suitable means, such as spot or ultrasonic welding. Still further, an electrical lead 100 (FIG. 3A) connected to an electrical source (not shown), e.g. a DC or AC power source, is connected to the terminal connector post 86. When power is provided to the terminal connector post 86, via the electrical lead 100, current enters the base plate 46, flows through the shunt welding tab 82 and electrical shunt 306, then into the brush 300, thereby causing the armature of motor 10 to rotate and the motor 10 to operate. In this regard, current need not flow through brush hood 42 and coupling tabs 54 to reach the brush 300.

Referring now to FIGS. 2A and 2B, to directly mount the brush box 30 to end cap 26, the first lock tab 94 is inserted under a first retaining arm 106 of the end cap 26, and the second lock tab 98 is inserted under a second retaining arm 110 of the end cap 26. The first lock tab 94 is then bent into a first lock tab recess 114 in the end cap 26. Likewise, the second lock tab 98 is bent into a second lock tab recess 118 in the end cap 26. The first and second lock tabs 94 and 98 bent into recesses 114, 118, and the first and second retaining arms 106 and 110 firmly secure the brush box 30 directly to end cap 26. The first and second lock tabs 94 and 98 prevent the brush box 30 from moving in an X or Y direction, while the first and second retaining arms 106 and 110 prevent the brush box 30 from moving in a Z direction.

FIG. 5 is a cross sectional view of a portion of the end cap and brush box assembly 22 illustrating an alternate embodiment of the lock tabs 94 and 98. In this embodiment, the first and second lock tabs 94 and 98 respectively include a first lock tab relief 122 and a second lock tab relief 126 formed at a distal ends of each of the lock tabs 94 and 98. The reliefs 122 and 126 allow an instrument or tool, such as a screwdriver, to be inserted under each of the reliefs 122 and 126 so that the lock tabs 94 and 98 can be unbent to permit easy removal of the brush box 30 from the end cap 26. Although the reliefs 122 and 126 are shown in FIG. 5 as generally having an 'S' shape, it should be appreciated that the reliefs 122 and 126 can have any shape suitable to allow an instrument or tool to be inserted under each of the reliefs 122 and 126 to unbend lock tabs 94 and 98. For example, the reliefs 122 and 126 could generally have a 'U' shape or a 'V' shape.

Figure 6:
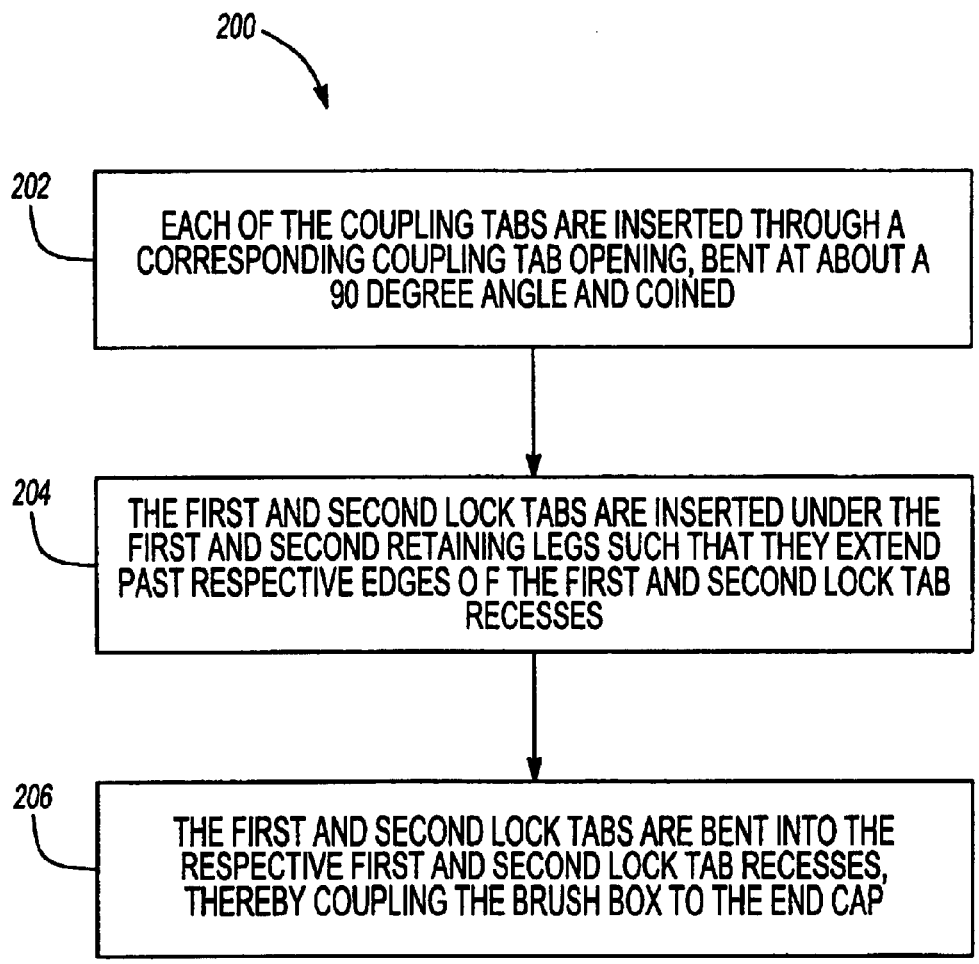
FIG. 6 is a flow chart illustrating a method of assembling the end cap and brush box assembly, shown in FIGS. 2A and 2B.

FIG. 6 is a flow chart 200 describing a method of assembling end cap and brush box assembly 22. Each of the coupling tabs 54 are inserted through a corresponding coupling tab opening 70, bent at approximately a 90° angle, thereby resulting in a two-piece brush box, as indicated at step 202. Each coupling tab 54 is coined, that is, stamped with at least one indentation 74, causing each coupling tab 54 to laterally expand, thereby tightly securing the brush hood 42 to the base plate 46. Each coupling tab 54 is illustratively coined during the process of bending it.

Next, the first lock tab 94 and second lock tab 98 are inserted under first and second retaining arms 106, 110 such that the first lock tab 94 extends past the edge of the first lock tab recess 114 and the second lock tab 98 extends past the edge of the second lock tab recess 118, as indicated at step 204. The first and second lock tabs 94 and 98 are then bent into the respective first and second lock tab recesses 114 and 118, thereby directly mounting the brush box 30 to end cap 26, as indicated at step 206.

While the invention has been described in terms of various specific embodiments, those skilled in the art will recognize that the invention can be practiced with modification within the spirit and scope of the claims.

What is claimed is:

1. An end cap and brush box assembly for a mechanically commutated electric motor comprising:
    an end cap; and
    a brush box including a brush hood and a base plate, the brush hood including a first leg having at least one coupling tab extending therefrom and a second leg having at least one coupling tab extending therefrom, the base plate including a first lock tab and a second lock tab for mounting the brush box assembly to the end cap, and a plurality of coupling tab openings.

2. The assembly of claim 1, wherein each of the coupling tabs is tapered at a distal end.

3. The assembly of claim 1, wherein each of the coupling tabs extends through a corresponding one of the coupling openings and is bent at approximately a 90° angle, thereby securing the brush hood to the base plate.

4. The assembly of claim 3, wherein each of the coupling tabs is coined with at least one stamped indentation to tightly securing the brush hood to the base plate.

5. The assembly of claim 4, wherein the stamped indentation in each of the coupling tabs comprises a gusset extending the length of each coupling tab.

6. The assembly of claim 4, wherein the stamped indentation in each of the coupling tabs comprises a plurality of recesses in edges of each coupling tab where each coupling tab is bent.

7. The assembly of claim 3 wherein the base plate includes a shunt welding tab to which an electrical shunt of a brush can be attached and a connector to which an electrical lead coupled to a source of power can be attached.

8. The assembly of claim 1, wherein the end cap further includes:
    a first lock tab recess into which the first lock tab is bent when the brush box is mounted on the end cap; and
    a second lock tab recess into which the second lock tab is bent when the brush box is mounted on the housing.

9. The assembly of claim 1 wherein the end cap is made of a material having high temperature capability and resilient mechanical properties.

10. An end cap and brush box assembly for a mechanically commutated electric motor comprising:
    an end cap; and
    a brush box including a first lock tab and a second lock tab for mounting the brush box assembly to the end cap;
    the end cap including a first retaining arm for retaining the first lock tab when the brush box is coupled to the end cap, and a second retaining arm for retaining the second lock tab when the brush box is coupled to the end cap.

11. The assembly of claim 10, wherein the first and second lock tabs each includes a relief formed in a distal end of the respective lock tabs, whereby when the brush box is mounted on the housing, the reliefs facilitating unbending of the first and second lock tabs so that the brush box can be removed from the end cap.

12. An end cap and brush box assembly for a mechanically commutated electric motor, comprising:
    an end cap;
    a two-piece brush box including a brush hood and a base plate, the brush hood having first and second legs, each of the first and second legs having at least one coupling tab extending therefrom through a corresponding coupling tab opening in the base plate, the coupling tabs bent against the base plate to secure the brush hood to the base plate;
    the base plate including first and second lock tabs for securing the base plate to the housing; and
    the base plate including a shunt welding plate and a connector.

13. The assembly of claim 12 wherein the coupling tabs are coined to tightly secure the brush hood to the base plate.

14. A method for assembling an end cap and brush box assembly for a mechanically commutated electric motor, comprising:
    inserting a plurality of coupling tabs extending from a brush hood into a plurality of corresponding openings in a base plate;
    bending the coupling tabs such that the brush hood is coupled to the base plate, thereby resulting in a two-piece brush box;
    coining each coupling tab by stamping at least one indentation into each coupling tab causing each coupling tab to laterally expand, thereby tightly securing the brush hood to the base plate; and
    mounting the two piece brush box directly on an end cap of the end cap and brush box assembly.

15. The method of claim 14, wherein stamping at feast one indentation into each coupling tab comprises stamping a gusset in each coupling tab whereby the gusset extends the length of the coupling tab.

16. The method of claim 14, wherein stamping at least one indentation into each coupling tab comprises stamping a plurality of recesses in edges of each coupling tab where it is bent.

17. The method of claim 14, wherein directly mounting the two piece brush box on the end cap comprises:

inserting first and second lock tabs of the two piece brush box under first and second retaining arms included in the end cap, such that the first and second lock tabs extend past respective edges of first and second lock tab recesses in the end cap; and bending the first and second lock tabs into the respective first and second lock tab recesses, thereby securing the two piece brush box to the housing.

18. The method of claim 17, wherein bending the first and second lock tabs comprises bending the first and second lock tabs into the first and second lock tab recesses such that a relief formed at a distal end of each of the first and second lock tabs is accessible to allow the first and second lock tabs to be unbent.

19. The method of claim 14, wherein the end cap is made of high temperature material having resilient mechanical properties.

20. A mechanically commutated electric motor comprising;
a housing;
an end cap and brush box coupled to the motor housing, the end cap assembly having an end cap made from a high temperature material;
a two piece brush box mounted directly on the housing of the end cap assembly, the brush box including a first lock tab and a second lock tab for securing the two piece brush box to the end cap; and
the brush box including a brush hood mounted to a base plate, the base plate having a shunt welding tab for attachment to an electrical shunt of a brush and a connector for attachment to an electrical lead coupled to a source of power.

21. The motor of claim 20, wherein the end cap is made of a material having resilient mechanical properties.

22. The motor of claim 20, wherein the brush hood includes at least first and second legs each having at least one coupling tab extending therefrom, the base plate including corresponding coupling tab openings through which the coupling tabs extend, the coupling tabs bent against the base plate to secure the brush hood to the base plate; the base plate including the first lock tab and the second lock tab.

23. The motor of claim 22, wherein each of the coupling tabs is tapered at a distal end.

24. The motor of claim 22, wherein each of the coupling tabs is coined with at least one stamped indentation to laterally displace at least a portion of each coupling tab, thereby tightly securing the brush hood to the base plate.

25. The motor of claim 24, wherein the stamped indentation in each of the coupling tabs comprises a gusset extending the length of each coupling tab.

26. The motor of claim 24, wherein the stamped indentation in each of the coupling tabs comprises a plurality of recesses in edges of each coupling tab where it is bent.

27. The motor of claim 20, wherein the end cap includes a first retaining arm for retaining the first lock tab and a second retaining arm for retaining the second lock tab when the two piece brush box is mounted on the housing.

28. The motor of claim 27, wherein the end cap further includes first and second lock tab recesses into which the first and second lock tabs are bent when the two piece brush box is mounted on the end cap.

29. The motor of claim 28, wherein the first and second lock tabs each includes a relief formed in a distal end, whereby when the two piece brush box is mounted on the end cap, the reliefs facilitate unbending of the first and second lock tabs so that the two piece brush box can be removed from the end cap.

30. An end cap and brush box assembly for a mechanically commutated motor, comprising:
an end cap made from a high temperature material;
a two piece brush box directly mounted on the housing, the two piece brush box including a brush hood having a first leg having at least one coupling tab extending therefrom and a second leg having at least one coupling tab extending therefrom; a base plate including a plurality of coupling tab openings and first and second lock tabs for securing the two piece brush box on the end cap, wherein each of the coupling tabs extends through a corresponding one of the coupling tab openings, is bent at approximately a 90° angle, and is coined with at least one stamped indentation to laterally displace at least a portion of each coupling tab, thereby tightly securing the brush hood to the base plate;
the end cap having first and second retaining arms for retaining the first and second lock tabs when the two piece brush box is mounted on the end cap and first and second lock tab recesses into which the first and second lock tabs are bent when the two piece brush box is mounted on the end cap; and
the first and second lock tabs each including a relief formed in a distal end of the respective lock tabs, whereby when the two piece brush box is mounted on the end cap, the reliefs facilitate unbending the first and second lock tabs so that the two piece brush box can be removed from the end cap.

31. The assembly of claim 30, wherein the end cap is made of a material having resilient mechanical properties.

32. The assembly of claim 30, wherein each of the coupling tabs is tapered at a distal end.

33. The assembly of claim 30, wherein the stamped indentation in each of the coupling tabs comprises a gusset extending the length of each coupling tab.

34. The assembly of claim 30, wherein the stamped indentation in each of the coupling tabs comprises a plurality of recesses in edges of each coupling tab where it is bent.

35. A brush box, comprising:
a brush hood including a first leg having at least one coupling tab extending therefrom and a second leg having at least one coupling tab extending therefrom; and
a base plate including a plurality of coupling tab openings, a first lock tab and a second lock tab;
wherein each of the coupling tabs extends through a corresponding one of the coupling tab openings, is bent at approximately a 90° angle, and is coined with at least one stamped indentation to laterally displace at least a portion of each coupling tab, thereby tightly securing the brush hood to the base plate.

36. The brush box of claim 35, wherein the first and second lock tabs each includes a relief formed in a distal end of the respective lock tabs.

37. The brush box of claim 35, wherein each of the coupling tabs is tapered at a distal end.

38. The brush box of claim 35, wherein the stamped indentation in each of the coupling tabs comprises a gusset extending the length of each coupling tab.

39. The brush box of claim 35, wherein the stamped indentation in each of the coupling tabs comprises a plurality of recesses in edges of each coupling tab where it is bent.

40. A method of mounting a brush box on an end cap of a mechanically commutated motor, comprising inserting first and second lock tabs of the brush box into the end cap and bending each of the first and second lock tabs into a bent shape.

41. The method of claim 40 wherein inserting the first and second lock tabs into the end cap includes inserting the first and second lock tabs under first and second retaining arms of the end cap.

42. The method of claim 41 wherein inserting the first and second lock tabs under the first and second retaining arms of the end cap includes inserting them so that they extend past respective edges of first and second lock tab recesses in the end cap and bending the first and second lock tabs includes bending them into the respective first and second lock tab recesses.

43. The method of claim 42 and further including forming the brush box as a two-piece brush box.

44. The method of claim 42 wherein bending the first and second lock tabs into the respective first and second lock tab recesses includes bending them so that a relief formed at a distal end of each of the first and second lock tabs is accessible to allow the first and second lock tabs to be unbent.

45. The assembly of claim 10, wherein the end cap further includes:

a first lock tab recess into which the first lock tab is bent when the brush box is mounted on the end cap; and a second lock tab recess into which the second lock tab is bent when the brush box is mounted on the housing.

* * * * *